(No Model.)

W. LORENZ.
CHUCK FOR HOLDING ROSE CUTTERS OR SIMILAR TOOLS.

No. 283,124. Patented Aug. 14, 1883.

Witnesses:
M. F. Boyle.
B. E. Stafford.

Inventor,
Wilhelm Lorenz
by his attorney
Thomas D. Stetson

United States Patent Office.

WILHELM LORENZ, OF CARLSRUHE, BADEN, GERMANY.

CHUCK FOR HOLDING ROSE-CUTTERS OR SIMILAR TOOLS.

SPECIFICATION forming part of Letters Patent No. 283,124, dated August 14, 1883.

Application filed May 26, 1882. (No model.) Patented in Germany July 14, 1881, No. 17,090; in France August 24, 1881, No. 144,528; in Belgium August 31, 1881, No. 55,606; in Austria-Hungary November 12, 1881, and in England December 29, 1881, No. 5,707.

*To all whom it may concern:*

Be it known that I, WILHELM LORENZ, of Carlsruhe, Grand Duchy of Baden, Empire of Germany, have invented certain new and useful Improvements relating to Tool-Holding Chucks for Rose-Cutters and Similar Implements, of which the following is a specification.

The invention is illustrated in the accompanying drawings, in which—

Figure 1:
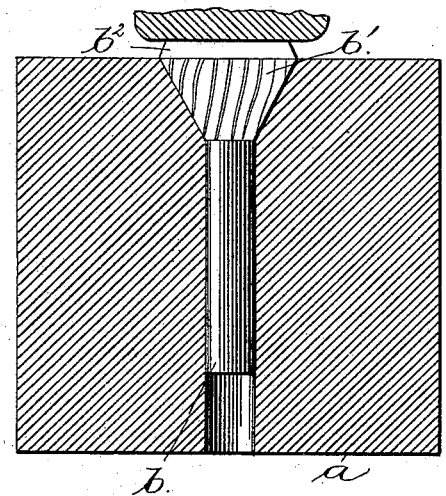
Figure 2:
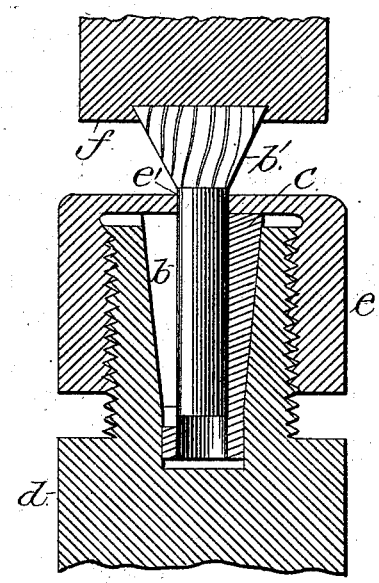

Figure 1 is a vertical section of the cutter and die, and Fig. 2 a similar view of the cutter and its holding means.

With the form of cutter as shown in Figs. 1 and 2, termed "face-cutter," dovetail or undercut grooves can be cut. The holding-stems $b$ and $h$ are formed at the smaller parts of the cutter-head. The shaping of these and many other forms of cutters is effected by pressing or stamping in correspondingly-formed dies. The dies being also produced in a corresponding way, the cutters are manufactured by machinery with great economy and perfection. The manufacture is effected as follows:

A cutter is first accurately formed by hand, to serve as a pattern from which others are to be produced. It is then hardened and pressed with considerable pressure in a matrix of soft steel, the cone or recess of which corresponds to the pitch-line of the teeth of the pattern; or, in other words, the general configuration corresponds to the form of the pattern. The teeth having been sharply impressed in the matrix, this is hardened, so as to constitute a die, (for which purpose I prefer the hardening process described in my German Patent No. 6,606; but any ordinary or suitable process may be employed,) and blanks $b$ $b'$ for rose-cutters, previously produced of soft steel in the required form, but without teeth, are pressed in such dies $a$, as shown in Fig. 1, and take the form of the teeth by the great pressure received from the die. The slight end movement of the blank in the die is of advantage in causing the form to be more sharply impressed. A very little oil should be used. The head $b^2$ serves to enable the teeth to be sharply formed, and is afterward turned off. The extreme outer portions of the teeth should be afterward smoothed and made even by turning or grinding, and the cutter, being well hardened, is ready for use.

The novelty in this application lies in the construction shown in Fig. 2, referring to which $d$ represents the cutter-spindle, having an inclined socket and a threaded exterior, as shown. $c$ represents an inclined clamping-socket, which embraces the shank $b$ of the rose-cutter $b'$, and operates in the inclined socket of the cutter-spindle $d$. A cap, $e$, perforated at $e'$ to receive the shank $b$ of the cutter, and having a female thread, operates on the threaded spindle $d$.

The clamping-socket $c$ may be formed as an open tube or in two pieces, the important and necessary features being a straight bearing on the tool-shank and an inclined bearing in the spindle-socket.

In this class of devices a firm and steady hold upon the tool is a positive necessity, and it is accomplished by the devices described. The cap bears against the clamp, and as it is screwed down the inclined surfaces force the clamp against the tool-shank with a firm and extended bearing.

What I claim as new is—

1. A threaded spindle having an inclined socket, and a clamp having inclined bearing-surfaces therein, combined with a threaded cap, adapted to force such inclined surfaces together and the clamp upon the tool-shank, as specified.

2. The combination of the threaded spindle $d$, having inclined socket, and the clamping-socket $c$, having inclined bearing-surfaces, combined with the perforated cap $e$ $e'$, as and for the purposes set forth.

In testimony whereof I have hereunto set my hand, at Berlin, Prussia, this 30th day of September, 1881, in the presence of two subscribing witnesses.

WILHELM LORENZ.

Witnesses:
 C. GROVEST,
 BERTHOLD ROI.